US007546153B2

(12) United States Patent
Kang

(10) Patent No.: US 7,546,153 B2
(45) Date of Patent: Jun. 9, 2009

(54) ANTENNA MOUNT FOR MOBILE TERMINAL

(75) Inventor: Dong-Gook Kang, Seoul (KR)

(73) Assignee: LG Electronics, Inc., Seoul (KR)

( * ) Notice: Subject to any disclaimer, the term of this patent is extended or adjusted under 35 U.S.C. 154(b) by 473 days.

(21) Appl. No.: 11/185,592

(22) Filed: Jul. 19, 2005

(65) Prior Publication Data

US 2006/0019727 A1 Jan. 26, 2006

(30) Foreign Application Priority Data

Jul. 21, 2004 (KR) ...................... 10-2004-0056918

(51) Int. Cl.
*H04M 1/00* (2006.01)
*H04B 1/034* (2006.01)

(52) U.S. Cl. .............. 455/575.7; 455/575.8; 455/575.1; 455/550.1; 455/562.1; 455/97

(58) Field of Classification Search .............. 455/575.7, 455/575.8, 575.1, 90.1–90.3, 550.1, 25, 63.4, 455/562.1, 97, 121, 193.1; 343/718, 720, 343/805, 878, 880, 871, 872

See application file for complete search history.

(56) References Cited

U.S. PATENT DOCUMENTS 6,324,380 B1 * 11/2001 Kiuchi et al. .............. 455/12.1
6,622,031 B1 9/2003 McCleary et al.
6,853,353 B2 * 2/2005 Wang et al. ................. 343/901

FOREIGN PATENT DOCUMENTS

WO WO 98/33231 7/1998
WO WO 01/05049 A 1/2001
WO WO 02/11303 A 2/2002

* cited by examiner

*Primary Examiner*—Eugene Yun
(74) *Attorney, Agent, or Firm*—Lee, Hong, Degerman, Kang & Waimey

(57) ABSTRACT

An antenna mounting device for a mobile terminal comprises a cradle configured to detachably install to the mobile terminal and a rotary bar rotatably coupled to the cradle, configured to rotate with respect to the cradle. The antenna mounting device also comprises an antenna coupled to the rotary bar, configured to rotate with the rotary bar. The rotation of the antenna is configured to control a reception angle of the antenna. The antenna mounting device may further comprise stopping protrusions formed on the cradle, configured to mate with stopping grooves formed in the mobile terminal to fix the cradle to the mobile terminal.

23 Claims, 4 Drawing Sheets

ANTENNA MOUNT FOR MOBILE TERMINAL

CROSS-REFERENCE TO RELATED APPLICATIONS

Pursuant to 35 U.S.C. § 119(a), this application claims the benefit of earlier filing date and right of priority to Korean Application No. 10-2004-0056918, filed on Jul. 21, 2004, the contents of which are hereby incorporated by reference herein in their entirety.

FIELD OF THE INVENTION

The present invention relates generally to an antenna mount and, more particularly, to an antenna mount for a mobile terminal.

BACKGROUND OF THE INVENTION

A mobile terminal may receive and transmit voice and data, such as data associated with wireless internet. Digital multimedia broadcasting (DMB), a system for receiving a broadcast is being studied. In the DMB system, a first antenna for receiving a broadcast and a second antenna for receiving voice must be separately mounted to the mobile terminal. For reliable radio transmission and reception, the antenna for receiving a broadcast must have a diameter of at least 15 mm and a length of at least 70 mm. Thus, inclusion of the antenna for receiving a broadcast may significantly increase the overall size of the mobile terminal.

SUMMARY OF THE INVENTION

Accordingly, the present invention is directed to an antenna mount that substantially obviates one or more problems due to limitations and disadvantages of the related art.

An object of the present invention is to provide an antenna mount to facilitate detachable mounting of an antenna to a mobile terminal, and a mobile terminal having the same.

Another object of the present invention is to provide an antenna mount to facilitate control of a reception angle of the antenna mounted to the mobile terminal, and a mobile terminal having the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, an antenna mounting device for a mobile terminal comprises a cradle configured to detachably install to the mobile terminal and a rotary bar rotatably coupled to the cradle, configured to rotate with respect to the cradle. The antenna mounting device also comprises an antenna coupled to the rotary bar, configured to rotate with the rotary bar. The rotation of the antenna is configured to control a reception angle of the antenna. The antenna mounting device may further comprise stopping protrusions formed on the cradle, configured to mate with stopping grooves formed in the mobile terminal to fix the cradle to the mobile terminal.

The antenna mounting device may further comprise a cover detachably installed at a rear side of the cradle, the rotary bar installed in a space between the cradle and the cover, the rotary bar configured to rotate in the space between the cradle and the cover. The antenna mounting device may further comprise guiding grooves consecutively formed at consecutive inner circumferential surfaces of the cradle and the cover in a circumferential direction, and guiding protrusions corresponding to the guiding grooves consecutively formed at an outer circumferential surface of the rotary bar in a circumferential direction. The antenna mounting device may further comprise indicator protrusions formed in a guiding groove of the guiding grooves, and indicator grooves corresponding to the indicator protrusions formed on a guiding protrusion of the guiding protrusions. The indicator protrusions may be configured to mate with the indicator grooves as the antenna is rotated to provide an indication to a user of relative orientation of the antenna. The antenna mounting device may further comprise a stopping jaw formed at an end of a guiding groove of the guiding grooves, and a stopper formed at an end of a guiding protrusion of the guiding protrusions, corresponding to the stopping jaw. The stopping jaw may be configured to mate with the stopper as the antenna is rotated to restrict rotation of the antenna. The cover may be coupled to the cradle by a fastener, such as a screw.

The antenna mounting device may further comprise first holding portions formed at four corners of the cradle, configured to mount the cradle to the mobile terminal. The antenna mounting device may further comprise a second holding portion formed at one side of the cradle, configured to hold a second antenna. The antenna mounting device may further comprise cut-out portions formed at both sides of a middle portion of the cradle.

In another embodiment, an antenna mounting device for a mobile terminal comprises a cradle configured to be installed to the mobile terminal and an antenna coupled to a rotary bar. The rotary bar is rotatably coupled to the cradle and configured to rotate within a certain angle range.

In yet another embodiment, a mobile terminal having an antenna mount comprises a mobile terminal body comprising mobile terminal circuitry and a cradle detachably installed to the mobile terminal body. The mobile terminal also comprises an antenna coupled to a rotary bar, the rotary bar being rotatably coupled to the cradle and configured to rotate within a certain angle range. The antenna may be integrally formed with the rotary bar.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
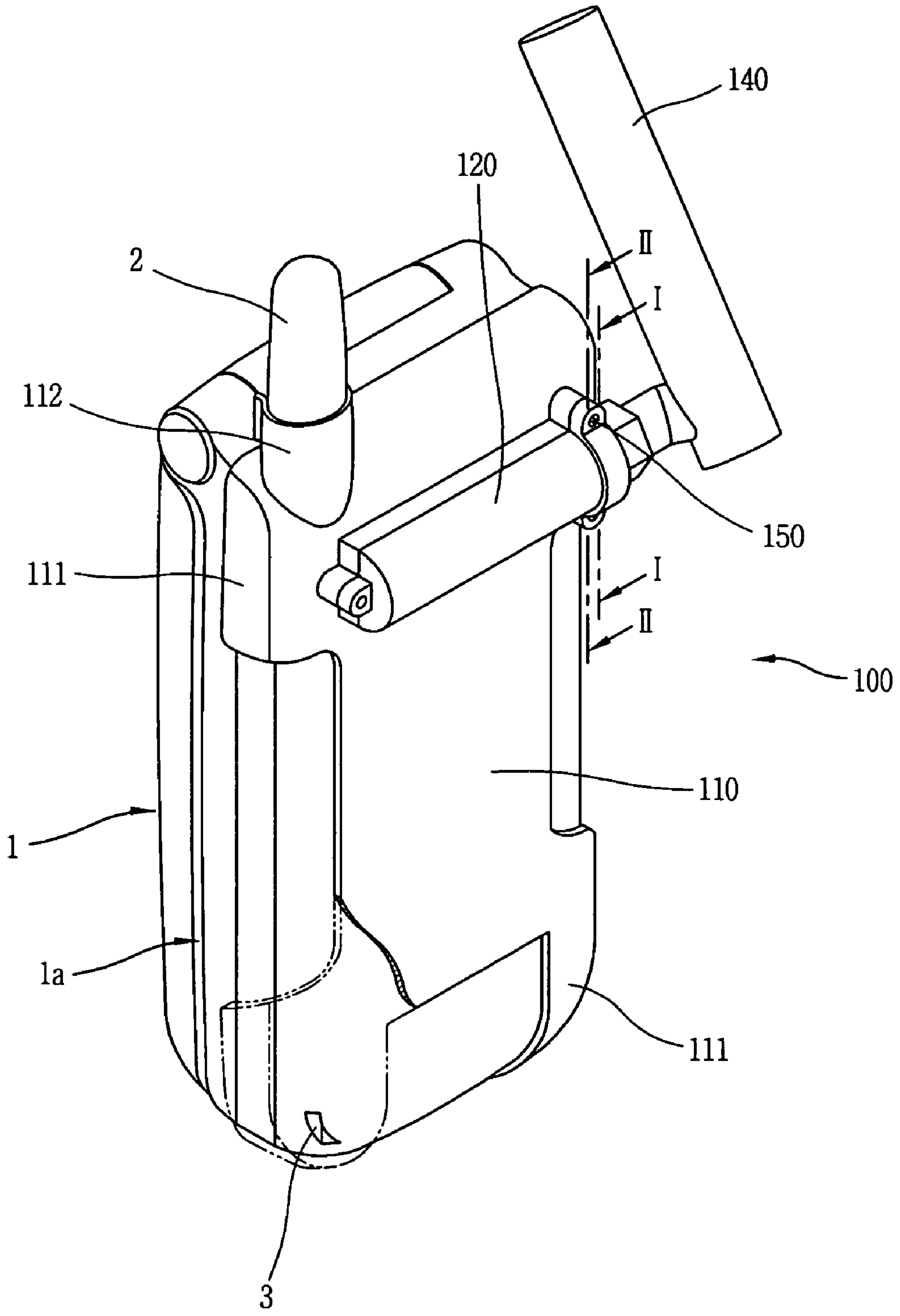
FIG. 1 is a perspective view showing a mobile terminal having an antenna mount, according to an embodiment of the present invention.
Figure 2:
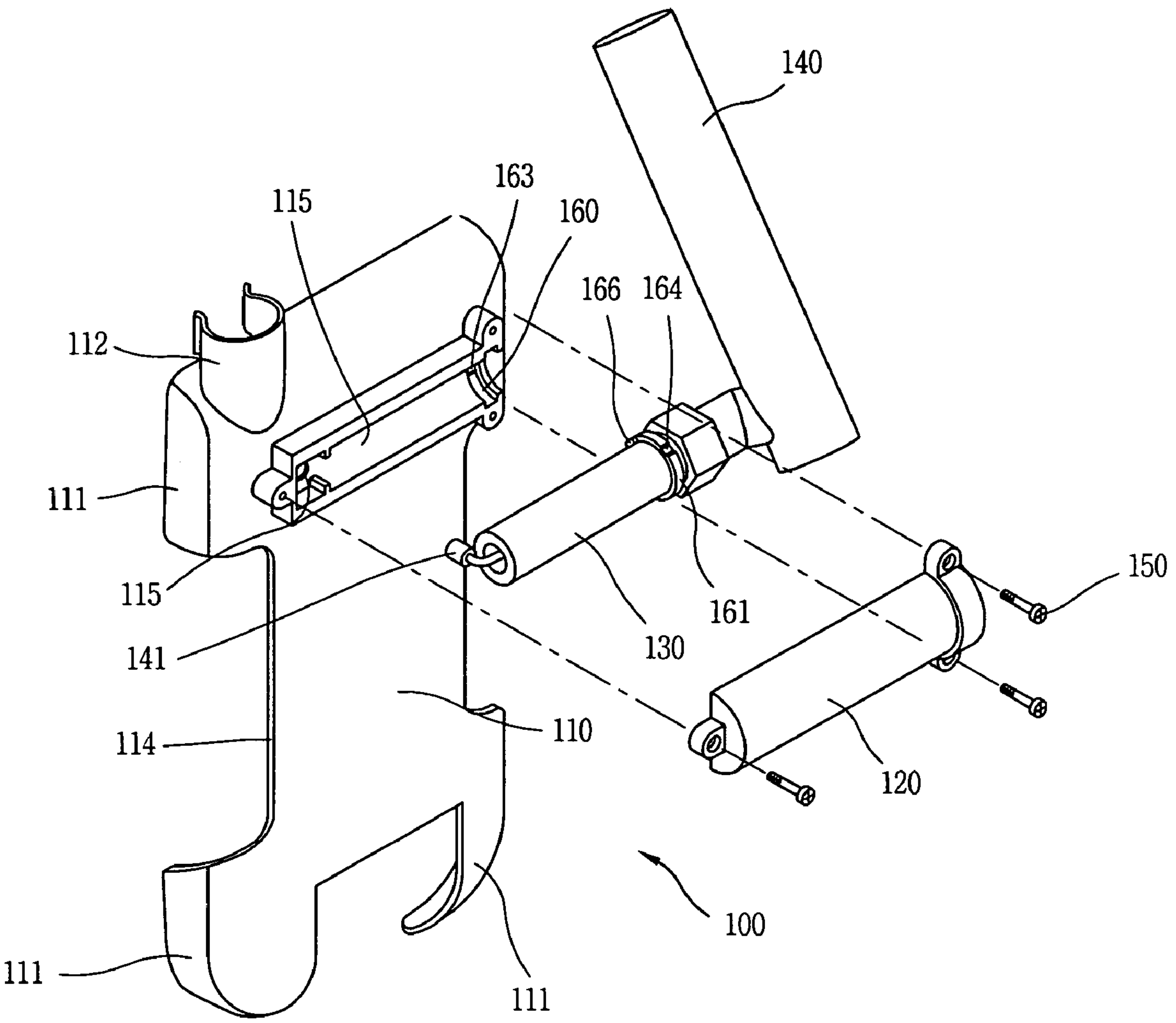
FIG. 2 is a disassembled perspective view showing the antenna mount for the mobile terminal, according to an embodiment of the present invention.
Figure 3:
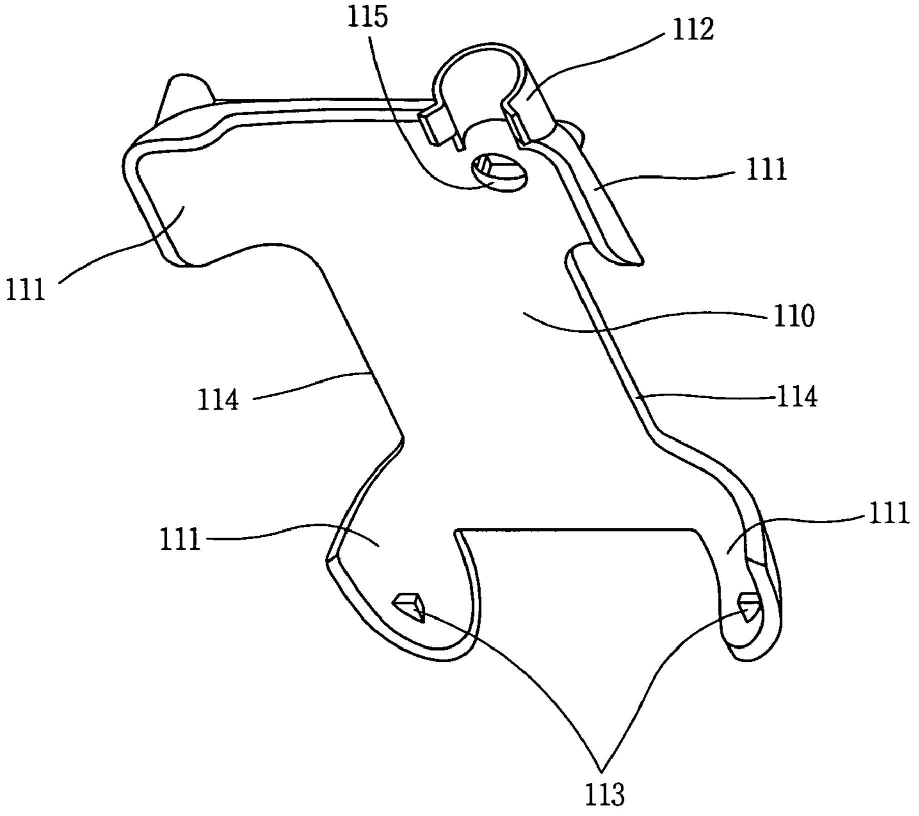
FIG. 3 is a perspective view showing a front surface of a cradle for the antenna mount, according to an embodiment of the present invention.
Figure 4:
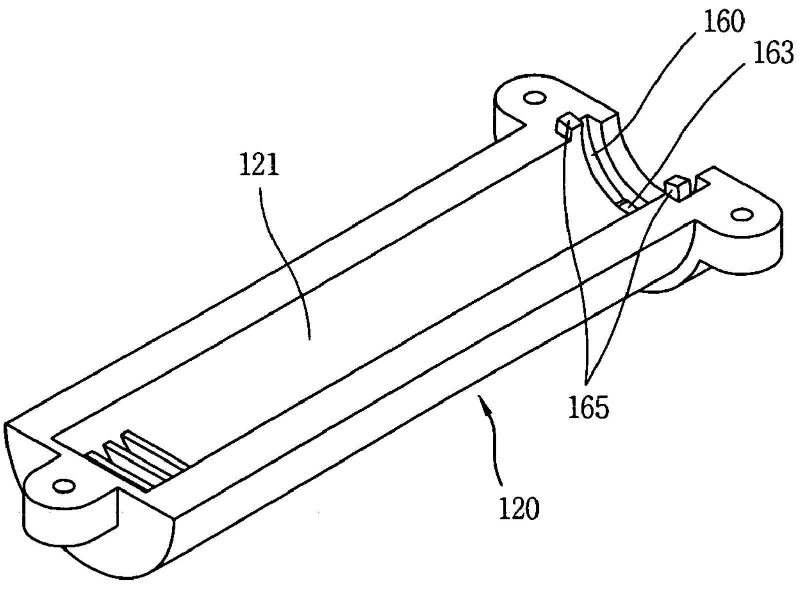
FIG. 4 is a perspective view showing a front surface of a cover for the antenna mount, according to an embodiment of the present invention.
Figure 5:
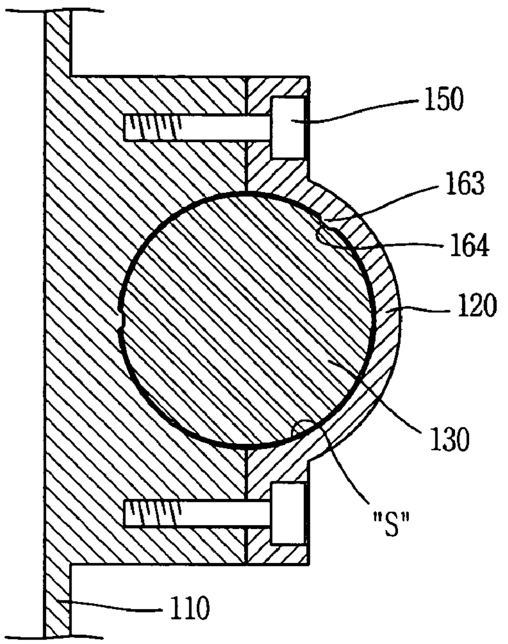
FIG. 5 is a sectional view taken along line I-I in FIG. 1.
Figure 6:
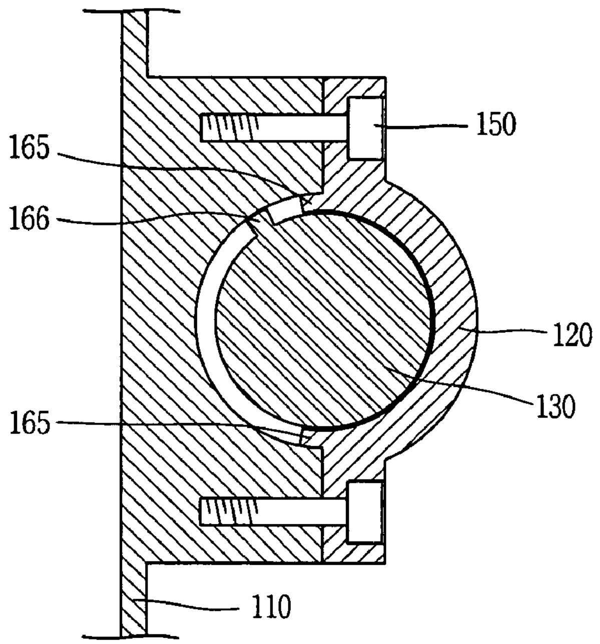
FIG. 6 is a sectional view taken along line II-II in FIG. 1.

An antenna mount for a mobile terminal according to the present invention is described below with reference to FIGS. 1-6. FIG. 1 is a perspective view showing a mobile terminal having an antenna mount, according to an embodiment of the present invention. FIG. 2 is a disassembled perspective view showing the antenna mount for the mobile terminal, according to an embodiment of the present invention. FIG. 3 is a perspective view showing a front surface of a cradle for the antenna mount, according to an embodiment of the present invention. FIG. 4 is a perspective view showing a front surface of a cover for the antenna mount, according to an embodiment of the present invention. FIG. 5 is a sectional view taken along line I-I in FIG. 1. FIG. 6 is a sectional view taken along line II-II in FIG. 1.

Referring to FIGS. 1-6, a mobile terminal 1 having an antenna mount 100 comprises a mobile terminal body 1*a*, a cradle 110 installed to the body 1*a*, a cover 120 installed at an rear surface of the cradle 110, and an antenna 140, having a rotary bar 130 installed in a space S, shown in FIG. 5, between the cradle 110 and the cover 120 to allow rotation of the antenna 140 within a certain angle range. The antenna 140 may preferably be configured to receive broadcasting, such as digital multimedia broadcasting (DMB), for example.

First holding portions 111 for mounting the cradle 110 to the mobile terminal 1 are preferably formed at four corners of the cradle 110. A second holding portion 112 for holding a second antenna 2 is formed at one side of the cradle 110. The second antenna 2 may preferably be configured for voice communication, for example. In one embodiment, the first holding portions 111 formed at lower corners on both sides of the cradle 110 are provided with stopping protrusions 113. The stopping protrusions 113 correspond to stopping grooves 3 formed at both ends of the mobile terminal 1. Cut-out portions 114 may be formed on both sides of a middle portion of the cradle 110. The cut-out portions 114 may make the cradle 110 more compact and provide an elastic force to each first holding portion 111 so that each first holding portion 111 may be elastically coupled to the four corners of the mobile terminal 1.

In operation, when a user affixes the cradle 110 to a rear surface of the mobile terminal 1, the first holding portions 111 formed at the four corners of the cradle 110 are affixed to the four corners of the mobile terminal 1. The second holding portion 112 holds the second antenna 2, thereby strengthening the coupling between the cradle 110 and the mobile terminal 1.

A first round portion 115 is formed at a rear surface of the cradle 110 and a second round portion 121 is formed in the cover 120 for insertion of the rotary bar 130. The first round portion 115 and the second round portion 121 may preferably have the same inner circumferential diameter. The cover 120 is detachably coupled to a rear surface of the cradle 110 by a general coupling device, such as, a screw 150. The rotary bar 130 of the antenna 140 is rotatably inserted into the space S between the first round portion 115 and the second round portion 121. The rotary bar 130 may preferably be an extension from one end of the antenna 140. That is, the rotary bar 130 and the antenna 140 may be of a one-piece construction. The rotary bar 130 facilitates rotation of the antenna 140 in order to control a reception angle of the antenna 140.

Guiding grooves 160 are consecutively formed at each inner circumferential surface of the first round portion 115 and the second round portion 121 in a circumferential direction, and guiding protrusions 161 corresponding to the guiding grooves 160 are consecutively formed at an outer circumferential surface of the rotary bar 130 in a circumferential direction.

In another embodiment, when the rotary bar 130 is rotated to a certain angle in order to control a reception angle of the antenna 140, the guiding protrusion 161 formed at the outer circumferential surface of the rotary bar 130 is rotated in a circumferential direction while inserted into the guiding groove 160. Accordingly, the rotary bar 130 is rotated and the reception angle of the antenna 140 is controlled.

Click protrusions (indicator protrusions) 163 may be formed at evenly spaced intervals in the guiding groove 160, and click grooves (indicator grooves)164 corresponding to the click protrusions 163 may be formed on the guiding protrusion 161 at the evenly spaced intervals of the click protrusions 163. Accordingly, when the antenna 140 is rotated in order to control the reception angle thereof, the rotary bar 130 integrally formed with the antenna 140 is rotated. Since each click protrusion 163 fits into each click groove 164, the user may sense a 'click' when rotating the antenna 140. By rotation of the antenna 140, the reception angle of the antenna 140 may be maintained.

A stopping jaw 165 is formed at the end of the guiding groove 160, and a stopper 166 corresponding to the stopping jaw 165 is formed at the end of the guiding protrusion 161. A hole 115 for inserting an antenna jack into the mobile terminal 1 is formed at a middle portion of the cradle 110, and a terminal 141 of the antenna 140 may be detachably connected to the antenna jack.

In yet another embodiment, the rotary bar 130 is rotatably coupled to the cradle 110 without use of a cover (e.g., cover 120), to allow rotation of the antenna 140. For example, the rotary bar 130 may be rotatably coupled to the cradle 110 using a prong-type fastener. That is, in this example, the rotary bar 130 may be 'snapped' into the prong-type fastener, allowing for rotation of the antenna 140.

An operation of the antenna 140 in a mobile terminal according to the present invention 140 is described below. To use the antenna 140, the cradle 110 is affixed to the rear surface of the mobile terminal 1. Since the first holding portions 111 formed at the four corners of the cradle 110 hold the four corners of the mobile terminal 1, the cradle 110 may be firmly coupled to the rear surface of the mobile terminal 1. The second holding portion 112 holds the antenna 2, which in turn strengthens the coupling between the cradle 110 and the mobile terminal 1. Furthermore, the stopping protrusions 113 formed at the inner surface of the cradle 110 are elastically coupled to the stopping grooves 3 formed at the rear surface of the mobile terminal 1. Therefore, the cradle 110 and the antenna 140 mounted to the cradle 110 may be firmly coupled to the mobile terminal 1.

Once the antenna 140 is mounted to the cradle 110, to control a reception angle of the antenna 140, the user rotates the antenna 140. The rotary bar 130 is integrally formed at one end of the antenna 140 thus rotates in the space S formed between the cradle 110 and the cover 120. The reception angle of the antenna 140 is thereby controlled. When the rotary bar 130 of the antenna 140 is rotated, the click protrusions 163 are consecutively inserted into the click grooves 164. Accordingly, the user may sense 'clicks' as the antenna 140 is rotated, thereby allowing the reception angle of the antenna 140 to be uniformly maintained. Furthermore, when the rotary bar 130 of the antenna 140 is rotated, the antenna 140 must be rotated within a certain angle range to prevent damage to the antenna 140. Therefore, when the rotary bar 130 of the antenna 140 is rotated beyond the certain angle range, the stopper 166 is stopped by the stopping jaw 165, thereby stopping the rotation of the antenna 140.

To detach the antenna 140 from the mobile terminal 1, the cradle 110 is pulled away from the mobile terminal 1 so that the stopping protrusions 113 are detached from the stopping grooves 3, the first holding portions 111 are detached from the four corners of the mobile terminal 1, and the second holding portion 112 are detached from the antenna 2. The detached antenna 140 may be separately stored and reused by being remounted to the mobile terminal 1, as necessary.

In one embodiment, an antenna mounting device for a mobile terminal comprises a cradle configured to detachably install to the mobile terminal and a rotary bar rotatably coupled to the cradle, configured to rotate with respect to the cradle. The antenna mounting device also comprises an antenna coupled to the rotary bar, configured to rotate with the rotary bar. The rotation of the antenna is configured to control a reception angle of the antenna. The antenna mounting device may further comprise stopping protrusions formed on the cradle, configured to mate with stopping grooves formed in the mobile terminal to fix the cradle to the mobile terminal.

The antenna mounting device may further comprise a cover detachably installed at a rear side of the cradle, the rotary bar installed in a space between the cradle and the cover, the rotary bar configured to rotate in the space between the cradle and the cover. The antenna mounting device may further comprise guiding grooves consecutively formed at consecutive inner circumferential surfaces of the cradle and the cover in a circumferential direction, and guiding protrusions corresponding to the guiding grooves consecutively formed at an outer circumferential surface of the rotary bar in a circumferential direction. The antenna mounting device may further comprise indicator protrusions formed in a guiding groove of the guiding grooves, and indicator grooves corresponding to the indicator protrusions formed on a guiding protrusion of the guiding protrusions. The indicator protrusions may be configured to mate with the indicator grooves as the antenna is rotated to provide an indication to a user of relative orientation of the antenna. The antenna mounting device may further comprise a stopping jaw formed at an end of a guiding groove of the guiding grooves, and a stopper formed at an end of a guiding protrusion of the guiding protrusions, corresponding to the stopping jaw. The stopping jaw may be configured to mate with the stopper as the antenna is rotated to restrict rotation of the antenna. The cover may be coupled to the cradle by a fastener, such as a screw.

The antenna mounting device may further comprise first holding portions formed at four corners of the cradle, configured to mount the cradle to the mobile terminal. The antenna mounting device may further comprise a second holding portion formed at one side of the cradle, configured to hold a second antenna. The antenna mounting device may further comprise cut-out portions formed at both sides of a middle portion of the cradle.

In another embodiment, an antenna mounting device for a mobile terminal comprises a cradle configured to be installed to the mobile terminal and an antenna coupled to a rotary bar. The rotary bar is rotatably coupled to the cradle and configured to rotate within a certain angle range.

In yet another embodiment, a mobile terminal having an antenna mount comprises a mobile terminal body comprising mobile terminal circuitry and a cradle detachably installed to the mobile terminal body. The mobile terminal also comprises an antenna coupled to a rotary bar, the rotary bar being rotatably coupled to the cradle and configured to rotate within a certain angle range. The antenna may be integrally formed with the rotary bar.

The present invention provides an antenna mount for a mobile terminal in which the cradle may be easily attached to the rear surface of the mobile terminal in order to receive a broadcast. Conversely, the cradle may be easily detached from the rear surface of the mobile terminal when the antenna is not needed. Therefore, an antenna of a relatively large size may be mounted to the mobile terminal for broadcast reception, but removed for storage so that the overall size of the mobile terminal is reduced.

Although the present invention is described with reference to digital multimedia broadcasting (DMB), the antenna of the present invention may be used in conjunction with any type of broadcasting or multicasting system.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. An antenna mounting device for a mobile terminal comprising:

a cradle configured to be detachably installed to the mobile terminal;

a rotary bar rotatably coupled to the cradle;

an antenna coupled to the rotary bar, configured to rotate with the rotary bar; and a cover detachably installed to the cradle, such that the cover and cradle together define a space within which the rotary bar can rotate with respect to the cradle, wherein the rotation of the antenna controls a reception angle of the antenna.

2. The antenna mounting device of claim 1, wherein the cover is coupled to the cradle by a fastener.

3. The antenna mounting device of claim 1, further comprising:

first holding portions formed at four corners of the cradle configured to mount the cradle to the mobile terminal.

4. The antenna mounting device of claim 3, further comprising:

a second holding portion formed at one side of the cradle configured to hold a second antenna.

5. The antenna mounting device of claim 3, further comprising:

cut-out portions formed at both sides of a middle portion of the cradle.

6. An antenna mounting device for a mobile terminal comprising:

a cradle configured to be detachably installed to the mobile terminal;

a rotary bar rotatably coupled to the cradle;

an antenna coupled to the rotary bar, configured to rotate with the rotary bar;

a cover detachably installed to the cradle, such that the cover and cradle together define a space within which the rotary bar can rotate with respect to the cradle; and stopping protrusions formed on the cradle configured to mate with stopping grooves formed in the mobile terminal to fix the cradle to the mobile terminal, wherein the rotation of the antenna controls a reception angle of the antenna.

7. An antenna mounting device for a mobile terminal comprising:

a cradle configured to be detachably installed to the mobile terminal;

a rotary bar rotatably coupled to the cradle;

an antenna coupled to the rotary bar, configured to rotate with the rotary bar; and a cover detachably installed at a rear side of the cradle, such that the cover and the rotary bar extend along a widthwise direction of the mobile and such that the cover and cradle together define a space within which the rotary bar can rotate with respect to the cradle, wherein the rotation of the antenna controls a reception angle of the antenna.

8. An antenna mounting device for a mobile terminal comprising:

a cradle configured to be detachably installed to the mobile terminal;

a rotary bar rotatably coupled to the cradle;

an antenna coupled to the rotary bar, configured to rotate with the rotary bar; and a cover detachably installed to the cradle, such that the cover and cradle together define a space within which the rotary bar can rotate with respect to the cradle;

guiding grooves consecutively formed at inner circumferential surfaces of the cradle and the cover in a circumferential direction; and guiding protrusions corresponding to the guiding grooves and consecutively formed at an outer circumferential surface of the rotary bar in a circumferential direction, wherein the rotation of the antenna controls a reception angle of the antenna.

9. The antenna mounting device of claim 8, further comprising:

indicator protrusions formed in one of the guiding grooves and indicator grooves corresponding to the indicator protrusions formed on one of the guiding protrusions, wherein the indicator protrusions are configured to mate with the indicator grooves as the antenna is rotated to provide an indication to a user of relative orientation of the antenna.

10. The antenna mounting device of claim 8, further comprising:

a stopping jaw formed at an end of one of the guiding grooves and a stopper formed at an end of one of the guiding protrusions, corresponding to the stopping jaw, wherein the stopping jaw is configured to mate with the stopper as the antenna is rotated to restrict rotation of the antenna.

11. An antenna mounting device for a mobile terminal, comprising:

a cradle configured to be installed to the mobile terminal;

an antenna coupled to a rotary bar, the rotary bar rotatably coupled to the cradle and configured to rotate within a certain angle range; and a cover detachably installed to the cradle, such that the cover and cradle together define a space within which the rotary bar can rotate within the certain angle range.

12. The antenna mounting device of claim 11, further comprising:

stopping protrusions formed on the cradle configured to mate with stopping grooves formed in the mobile terminal to fix the cradle to the mobile terminal.

13. The antenna mounting device of claim 11, wherein the cover is coupled to the cradle by a fastener.

14. The antenna mounting device of claim 11, further comprising:

first holding portions formed at four corners of the cradle configured to mount the cradle to the mobile terminal.

15. The antenna mounting device of claim 14, further comprising:

a second holding portion formed at one side of the cradle configured to hold a second antenna.

16. The antenna mounting device of claim 14, further comprising:

cut-out portions formed at both sides of a middle portion of the cradle.

17. An antenna mounting device for a mobile terminal, comprising:

a cradle configured to be installed to the mobile terminal;

an antenna coupled to a rotary bar, the rotary bar rotatably coupled to the cradle and configured to rotate within a certain angle range; and a cover detachably installed at a rear side of the cradle, such that the cover and the rotary bar extend along a widthwise direction of the mobile terminal and such that the cover and cradle together define a space within which the rotary bar can rotate within the certain angle range.

18. An antenna mounting device for a mobile terminal comprising:

a cradle configured to be installed to the mobile terminal;

an antenna coupled to a rotary bar, the rotary bar rotatably coupled to the cradle and configured to rotate within a certain angle range;

a cover detachably installed to the cradle, such that the cover and cradle together define a space within which the rotary bar can rotate within the certain angle range;

guiding grooves consecutively formed at inner circumferential surfaces of the cradle and the cover in a circumferential direction; and guiding protrusions corresponding to the guiding grooves and consecutively formed at an outer circumferential surface of the rotary bar in a circumferential direction.

19. The antenna mounting device of claim 18, further comprising:

indicator protrusions formed in one of the guiding grooves and indicator grooves corresponding to the indicator protrusions formed on the guiding protrusions, wherein the indicator protrusions are configured to mate with the indicator grooves as the antenna is rotated to provide an indication to a user of relative orientation of the antenna.

20. The antenna mounting device of claim 18, further comprising:

a stopping jaw formed at an end of one of the guiding grooves and a stopper formed at an end of one of the guiding protrusions, corresponding to the stopping jaw, wherein the stopping jaw is configured to mate with the stopper as the antenna is rotated to restrict rotation of the antenna.

21. A mobile terminal, comprising:

a mobile terminal body comprising mobile terminal circuitry and a first antenna for voice communication;

a cradle detachably installed on the mobile terminal body;

a cover detachably mounted to a rear side of the cradle, such that the cover and cradle together define a space; and a second antenna for receiving a broadcast signal and coupled to a rotary bar, the rotary bar rotatably installed in the space by the cradle and the cover.

22. The mobile terminal of claim 21, further comprising:

stopping protrusions formed on the cradle configured to mate with stopping grooves formed in the mobile terminal to fix the cradle to the mobile terminal.

23. The mobile terminal of claim 21, wherein the antenna is integrally formed with the rotary bar.

* * * * *